United States Patent [19]

Parker et al.

[11] Patent Number: 5,186,794
[45] Date of Patent: Feb. 16, 1993

[54] ALKALI METAL HYDROXIDE GENERATION SYSTEM AND THE METHOD THEREFOR

[75] Inventors: Robin Parker, Miami; Robert Hanrahan; Avinash Gupta, both of Gainesville, all of Fla.

[73] Assignee: Solar Reactor Technologies, Inc., Miami, Fla.

[21] Appl. No.: 589,916

[22] Filed: Sep. 26, 1990

[51] Int. Cl.$^5$ .......................... C01B 7/00; C25B 1/02; C25B 1/16
[52] U.S. Cl. ...................... 204/98; 204/129; 204/157.48; 204/193; 204/242
[58] Field of Search .................. 204/157.48, 157.52, 204/129, 98, 193, 242

[56] References Cited

U.S. PATENT DOCUMENTS 4,051,005 9/1977 Krascella .................. 204/157.1 R
4,210,501 7/1980 Dempsey et al. .................. 204/129

OTHER PUBLICATIONS

B. Reichman et al., "Photoproduction of Halogens Using Platinized TiO$_2$", NASA Tech Briefs, vol. 5, No. 4 (Winter 1980), pp. 449-450.

Primary Examiner—Wayne Langel
Attorney, Agent, or Firm—Cushman Darby & Cushman

[57] ABSTRACT

Disclosed are both an apparatus and method for the radiation-augmented electrolytic production of alkali metal hydroxide, molecular halogen, and hydrogen.

Reduction of electrical energy requirements is achieved by using radiation to activate photo-sensitive metallic hexahalide ions, which reduces the electrolysis electrode potential. By utilizing radiation-augmented electrolysis, the conventional halogen oxidation reaction is replaced by oxidation of a metallic hexahalide, which occurs at a lower overvoltage and smaller reversible cell potential. Radiant energy thus replaces electrical energy for the production of alkali metal hydroxide, molecular halogen, and hydrogen. Since the action of radiation on the oxidized form of the metallic hexahalide, in the presence of a concentrated halide ion, leads to the production of free halogen gas, the net products are not modified by use of the metallic hexahalide, but the energy requirement of the process is reduced.

15 Claims, 3 Drawing Sheets

ALKALI METAL HYDROXIDE GENERATION SYSTEM AND THE METHOD THEREFOR

BACKGROUND OF THE INVENTION

1. Field of the Invention

The present invention relates to an apparatus and method for generating alkali metal hydroxide, molecular halogen, and hydrogen. The invention relates more specifically to an apparatus and method for the solar-augmented electrolytic production of the aforementioned products from a concentrated aqueous solution of alkali halide.

The subject matter of this patent application is related in part to pending patent application Ser. No. 07/526,435, filed May 22, 1990, pending which is a continuation-in-part of patent application Ser. No. 07/393 filed Dec. 14, 1987, abandoned, which in turn is a continuation-in-part of Ser. No. 804,518 filed Dec. 4, 1985, abandoned.

2. Description of the Related Art

The electrolysis of an aqueous solution of alkali chloride to produce hydrogen, chlorine, and caustic soda is a well-known and valuable industrial process. Recent major advances in the chlor-alkali industry include more efficient solid-state rectifiers, larger and higher capacity electrolytic cells, dimensionally stable anodes to replace graphite, and cation exchange membranes to replace the traditional asbestos diaphragms.

Despite these advances, the industry is still faced with the serious problem of contending with the substantial electrical power demand associated with the process. The extent of this demand is evidenced by the fact that 0.5% of all the electric power generated annually in the United States is utilized by the chlor-alkali industry.

The maximum amount of chlorine and caustic soda that can be produced using either mercury- or diaphragm-cell technology is determined by the total number of ampere-hours of direct current electricity consumed. The corresponding energy consumption is a direct, linear function of the cell working voltage, with the greatest contributor to the cell voltage being the energy required to meet the thermodynamic potential.

Prior art efforts to reduce the electrical power requirement have focused on the electrolytic cell itself, rather than the electrolyte employed therein. The present invention, however, reduces the electrical power requirement by using radiation to activate photo-sensitive transition metal hexahalide ions, which reduces the electrolysis electrode potential.

The crystal field and electron transfer spectra of Group VIII transition metal complexes have been described by C. K. Jorgensen, *Acta Chimica Scandanavica*. Vol. 10, No. 4 (1956), 500, 518; Vol. 11, No. 1 (1957), 151, 166. A description of the photochemical effect on transition metal complex ions when subjected to radiation at visible wavelengths is provided in H. B. Gray, *Science*, Vol. 214 (1981), 1201.

SUMMARY OF THE INVENTION

It is an object of this invention to provide an apparatus and method for the radiation-augmented electrolysis of a concentrated aqueous solution of alkali halide to produce alkali metal hydroxide, molecular halogen, and hydrogen.

Accordingly, the present invention provides both an apparatus and method for the radiation-augmented electrolytic production of alkali metal hydroxide, molecular halogen, and hydrogen.

Reduction of electrical energy requirements is achieved by using radiation to activate photo-sensitive metallic hexahalide ions, which reduces the electrolysis electrode potential. By utilizing radiation-augmented electrolysis, the conventional halogen oxidation reaction is replaced by oxidation of a metallic hexahalide, which occurs at a lower overvoltage and smaller reversible cell potential. Radiant energy thus replaces electrical energy for the production of alkali metal hydroxide, molecular halogen, and hydrogen. Since the action of radiation on the oxidized form of the metallic hexahalide, in the presence of a concentrated halide ion, leads to the production of free halogen gas, the net products are not modified by use of the metallic hexahalide, but the energy requirement of the process is reduced.

BRIEF DESCRIPTION OF THE DRAWINGS

Other objects, features, and advantages of the present invention will become more fully apparent from the following detailed description of the preferred embodiments, the appended claims, and the accompanying drawing. As depicted in the attached drawings:

DESCRIPTION OF THE PREFERRED EMBODIMENTS

Figure 1:
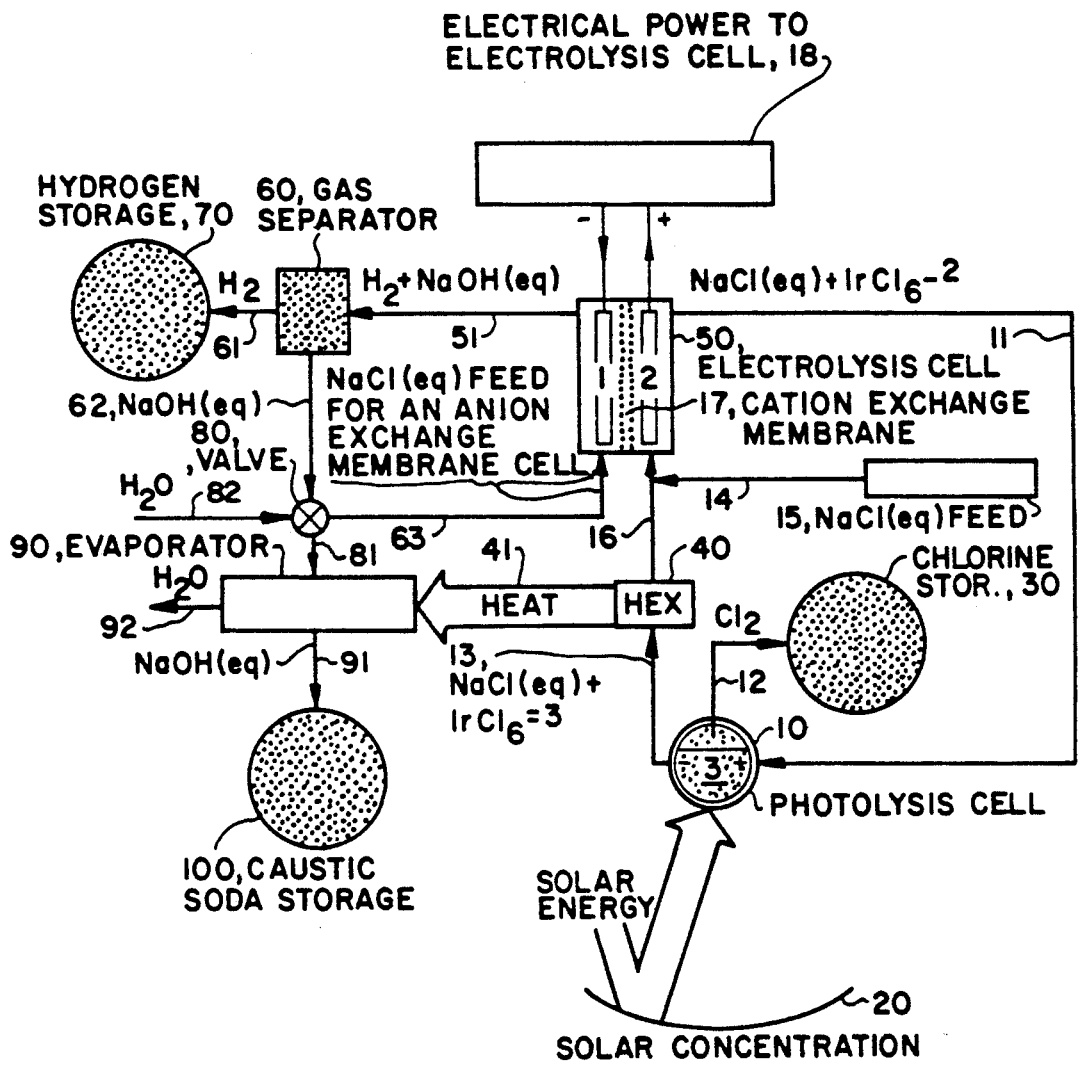
FIG. 1 is a schematic block diagram of the apparatus and method embodied by the radiation-augmented, electrolytic process for the production of alkali metal hydroxide, molecular halogen, and hydrogen.

The present invention will be disclosed in terms of the currently perceived preferred embodiments thereof.

By way of example, the present invention will be disclosed in connection with Group IA alkali metals, Group VIII transition metals, halogens, and halide ions. For illustrative purposes, sodium is disclosed as the alkali metal, iridium is disclosed as the transition metal, and chlorine is disclosed as the halogen.

The radiation flux employed may generally be described as electromagnetic radiation. Preferably, solar rays are the source of that radiation. It should be readily apparent to those skilled in the art, however, that other sources of radiation energy might be suitably employed. Exemplary alternative sources include photons generated from nuclear-excited flash lamps, alpha particles, beta particles, gamma rays, x-rays, protons, or fission fragments.

The present invention describes a method for the production of sodium hydroxide, chlorine, and hydrogen by utilizing a combination of electrolysis and photolysis. The electrolysis process is based on the electrochemistry of an electrolytic solution. The photolytic process is based on the photochemistry of transition metal complex ions.

The electrolytic solution comprises not only the conventional sodium chloride, however, but another electrolyte as well, consisting of a metallic element of the type known as a Group VIII transition or post-transition element, in the chemical form of a hexahalide complex ion, along with a suitable counter-ion of opposite charge. The lower overvoltage and smaller reversible cell potential associated with the anodoic oxidation of this transition metal complex is the incentive for employing solar energy to reduce the cost of producing sodium hydroxide, chlorine, and hydrogen.

The present invention thus supplants a portion of the electrical power requirement by first photochemically reducing an iridium hexachloride complex while oxidizing chloride in a photolysis cell, and then electrolytically reducing water to molecular hydrogen and hydroxide ions, while oxidizing the iridium complex in an electrolysis cell.

The transition metallic element is in one or more than one available positive oxidation states. The overall charge of the complex ion, e.g., a metallic hexahalide $ZX_6^{-n}$, where "Z" is the transition metal, "$X_6$" is the hexahalide, and "$-n$" is the overall charge, could be minus three ($-3$), or $ZX_6^{-3}$.

Under the influence of an electric field, the negative ion $ZX_6^{-3}$ migrates toward the anode, where it is oxidized, leading to an ion of minus two ($-2$) charge:

$$ZX_6^{-3} \rightarrow ZX_6^{-2} + e^-.$$

The species $ZX_6^{-2}$ is then exposed to visible light, whereby it is promoted to an excited electronic state:

$$ZX_6^{-2} + h\nu \rightarrow (ZX_6^{-2})^*.$$

The $(ZX_6^{-2})^*$ is then able to oxidize the halide ion in sodium chloride, for example, which has a minus one ($-1$) oxidation state, to the elemental halogen, which has a zero oxidation state:

$$(ZX_6^{-2})^* + X^- \rightarrow ZX_6^{-3} + \tfrac{1}{2}X_2$$

To ensure that the process proceeds as desired, it is required that the $ZX_6^{-2}$ absorb visible light more strongly than the $ZX_6^{-3}$. This condition can be achieved by providing these species in the form of the indicated complex ions. These species consist of a central Group VIII metallic ion in the positive oxidation state, surrounded and bound to one or more charged or neutral ions or molecules referred to as ligands.

Exemplary metallic ion species include Fe, Co, Ni, Ru, Rh, Pd, Os, Ir, and Pt. Typical oxidation states of these ions may range from $+1$ to $+8$. Typical ligands include molecules such as $H_2O$, $NH_3$, and CO, as well as ions such as $CN^-$, $NO_2^-$, $Cl^-$, $Br^-$, and $I^-$.

An example of the photochemical effect of transition metal complex ions is the charge transfer transition in $IrCl_6^{-2}$ when subjected to radiation at visible wavelengths. This reaction is described by H.B. Gray, Science, Vol. 214 (1981), 1201:

$$IrCl_6^{-2} + Cl^- + h\nu \rightarrow IrCl_6^{-3} + \tfrac{1}{2}Cl_2 \quad (1)$$

In principle, a related charge transfer transition in $IrCl_6^{-3}$ could facilitate the reduction of protons, completing a cycle that produces hydrogen and chlorine from NaCl and water:

$$IrCl_6^{-3} + H^+ + h\nu \rightarrow IrCl_6^{-2} + \tfrac{1}{2}H_2 \quad (2)$$

The absorption coefficient of $IrCl_6^{-3}$, however, is more than an order of magnitude smaller than that of $IrCl_6^{-2}$ at solar wavelengths. Furthermore, the quantum yield for the formation of $H_2$ is small. Reaction (2) is therefore not feasibly integrated in a practical cycle.

A high quality aspect of solar radiation is the short average wavelength of solar photons of approximately 500 nm. The energy of an average solar photon is sufficient to cause selected photochemical reactions which can produce energy, or energy-rich chemical products, which may then be stored for subsequent use. Photochemical research has demonstrated that when NaCl solutions containing $IrCl_6^{-2}$ ions are irradiated, $IrCl_6^{-3}$ and chlorine gas are produced.

Solar-augmented electrolysis thus comprises supplying an aqueous solution of NaCl and $IrCl_6^{-2}$ to a photolysis cell, which is irradiated to reduce the $IrCl_6^{-2}$ to $IrCl_6^{-3}$ and produce gaseous $Cl_2$, which is continuously swept from the cell, while simultaneously recovering the solar thermal energy by heating the solution. The aqueous solution of NaCl and $IrCl_6^{-2}$, or anolyte, is then introduced into an anode half cell which is separated from the cathode half cell by a semipermeable membrane of the type referred to as a cation exchange membrane. The catholyte comprises a circulating solution of aqueous NaOH in which the concentration of NaOH increases as the electrolysis proceeds.

An electrical potential is applied across the anode and the cathode, whereby $IrCl_6^{-3}$ is oxidized to $IrCl_6^{-2}$ at the anode, and $H_2$ is evolved at the cathode. The lower overvoltage and smaller reversible cell potential associated with the anodoic oxidation of $IrCl_6^{-3}$ is the basis for employing solar energy to reduce the cost of producing electrolytic sodium hydroxide.

While it is preferable to employ a cation exchange membrane in the electrolytic cell as a result of the higher cell efficiency associated with its use, an anion exchange membrane may similarly be employed in the present invention. In another possible embodiment of the present invention, a diaphragm cell could be employed, with the catholyte comprising a circulating solution of aqueous NaOH and NaCl.

Of the two redox reactions (1) and (2), reaction (1) is spontaneous in the presence of sunlight and reaction (2) is not. In an embodiment of the present invention, the redox reactions are therefor organized such that the photolysis reaction in a separate photocell may be combined with conventional electrolysis. Conventional electrolysis of NaCl(aq) consists of the following half reactions:

| | | |
|---|---|---|
| $2H_2O + 2e^- \rightarrow 2OH^- + H_2(gas)$ | Cathode | (3) |
| $E_o = -0.83\ V$ | | |
| $2Cl^- \rightarrow Cl_2(gas) + 2e^-$ | Anode | (4) |
| $E_o = -1.36\ V$ | | |
| $2Cl^- + 2H_2O \rightarrow 2OH^- + H_2 + Cl_2$ | Net | |
| $E_o = -2.19\ V$ | | |

In the process according to the present invention, reaction (3) is unchanged. The anode reaction is replaced with a cycle including the photochemical redox reaction (1) and an electrolysis half-cell reaction. The mechanism of the solar-augmented anode reaction is as follows:

$$IrCl_6^{-2} + h\nu \rightarrow IrCl_6^{-2*} \quad (5)$$

$$IrCl_6^{-2*} + Cl^- \rightarrow IrCl_6^{-3} + \tfrac{1}{2}Cl_2 \quad (6)$$

$$IrCl_6^{-3} \rightarrow IrCl_6^{-2} + e^- \quad (7)$$

Reaction (5) is the photo excitation step; reaction (6) represents the electron transfer from the chloride ion to the excited iridium chloride; and, reaction (7) represents the electrochemical donation of an electron by $IrCl_6^{-3}$. The overall reaction may thus be generically represented as:

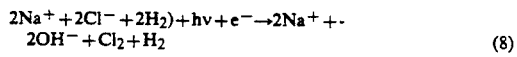

Reaction (8) thus illustrates the overall photolysis and electrolysis of sodium chloride in an aqueous solution seeded with iridium hexachloride. The iridium complex does not appear in reaction (8) since its overall role in the process can be described as that of a photoactivator. Solar-augmented electrolysis of NaCl(aq) thus consists of the following half reactions:

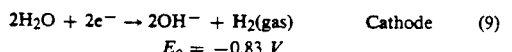

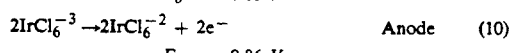

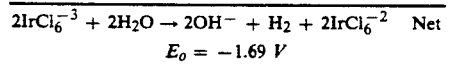

When these steps are followed by reactions (5) and (6), the overall process, reaction (8), results.

Though the photolysis step has been described in terms of the use of a single species of metallic hexahalide, other embodiments thereof are possible. To supplement the individual absorption spectrum and thereby provide a broader band and more continuous absorption of photolytic energy, more than one type of metallic hexahalide may be used simultaneously. Thus, exemplary multi-metallic hexahalide solutions could include $RuCl_6/RhCl_6/IrCl_6$, or any suitable combination of the Group VIII metals in conjunction with a single halogen species. The metallic hexahalides selected are those with a half-cell potential which is lower than that of the halogen gas alone, to ensure that the gas is not evolved at the anode.

The efficiency of the electrolytic process is improved by using hydrogen chloride to acidify the brine anolyte. Brine acidification is required to avoid any undesirable, parasitic anode reaction, such as, for example, the evolution of oxygen. Acidification of the anolyte also prevents precipitation of the photosensitive transition metal species which is added to the electrolyte.

The apparatus and method of an illustrative embodiment of the invention will now be described with reference to FIG. 1. A concentrated aqueous solution of NaCl and $IrCl_6^{-2}$ is conveyed to photolysis cell 10. Solar radiation, comprising both photolytic and thermal energy, is introduced into the photolysis cell by means of solar concentrator 20. To ensure that the photolytic reaction proceeds, the chlorine evolved must be swept from the photolytic solution and conducted away from the cell to chlorine storage vessel 30. Exemplary methods of effecting the chlorine sweep are based on partial pressure reduction, and include steam stripping or boiling with an inert gas. The $IrCl_6^{-3}$ produced in the photolysis step, in solution with NaCl, is mixed with a stream of HCl and conducted to the anode chamber of electrolysis cell 50.

Since the operating temperature of the photolysis cell is preferably above 100° C. and that of the electrolysis cell is below 90° C., means are provided for further enhancing the thermal efficiency of the process by recovering heat from the $IrCl_6^{-3}/NaCl$ stream through a conventional heat exchange apparatus 40.

The anode chamber of the electrolysis cell is separated from the cathode chamber by a semipermeable membrane. Means are provided for applying an electrical potential across the anode and cathode cells.

The $NaOH/H_2O/H_2$ stream from the cathode cell is conveyed to gas separator 60, where the $H_2$ is separated from the liquid stream and is conveyed to hydrogen storage vessel 70. The circulating aqueous NaOH solution is conveyed through recycle valve 80 to the cathode chamber of electrolysis cell 50. When the circulating aqueous NaOH solution leaving the electrolysis cell reaches a predetermined concentration, a portion of the NaOH solution from gas separator 60 is diverted to evaporator 90 by means of recycle valve 80. In the evaporator, thermal energy recovered in heat exchanger 40 is used to provide the heat necessary to evaporate the liquid water. The resultant concentrated solution of NaOH is conveyed to caustic soda storage vessel 100.

Figure 2:
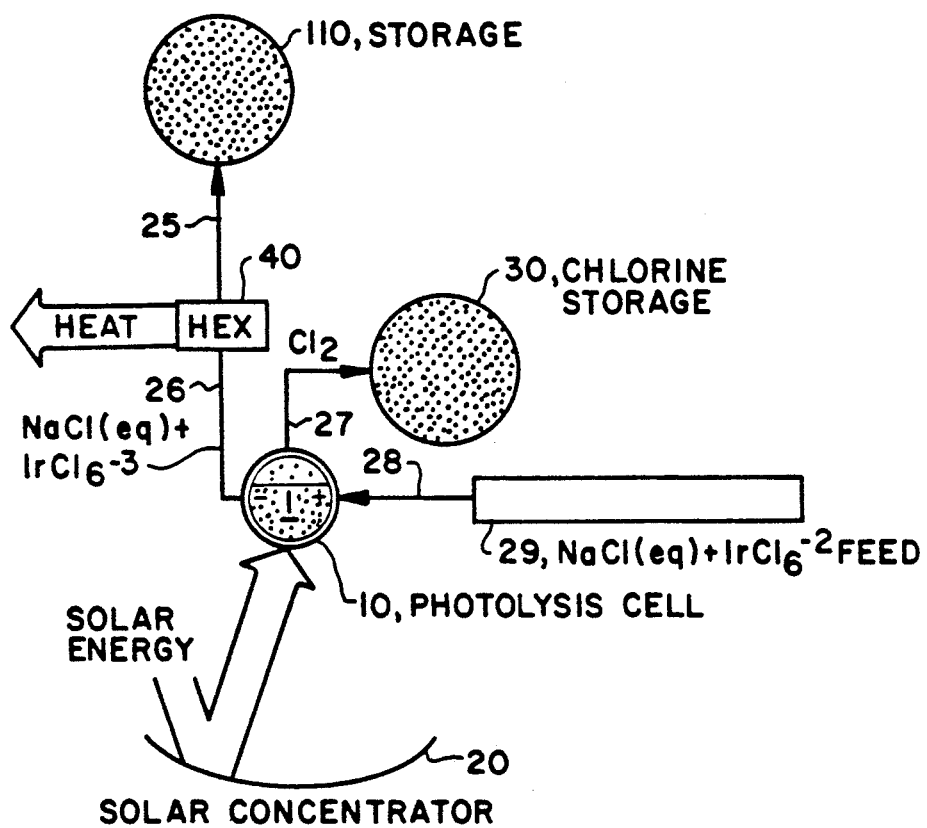
FIG. 2 is a schematic block diagram of the apparatus and method embodied by the electrolyte-conditioning and -storage mode of operation of the present invention.

The apparatus and method of another illustrative embodiment will now be described with reference to FIG. 2, which depicts the electrolyte-conditioning and -storage mode of operation of the present invention. During the solar day, a solution of sodium chloride seeded with $IrCl_6^{-2}$ at the start of the cycle is photolyzed to establish an inventory of $IrCl_6^{-3}$. The $IrCl_6^{-3}$ is then stored for subsequent electrolysis during periods of off-peak power.

In the electrolyte-conditioning mode of operation, an aqueous solution of NaCl and $IrCl_6^{-2}$ is conveyed to photolysis cell 10. Solar radiation is introduced into the photolysis cell by means of solar concentrator 20. Chlorine evolved in the photolysis step is conducted away from the photolysis cell and returned to chlorine storage vessel 30. The $IrCl_6^{-3}$ produced in the photolysis step is then cooled in heat exchanger 40 and returned to sodium chloride and metallic hexachloride storage vessel 110 for subsequent use.

Figure 3:
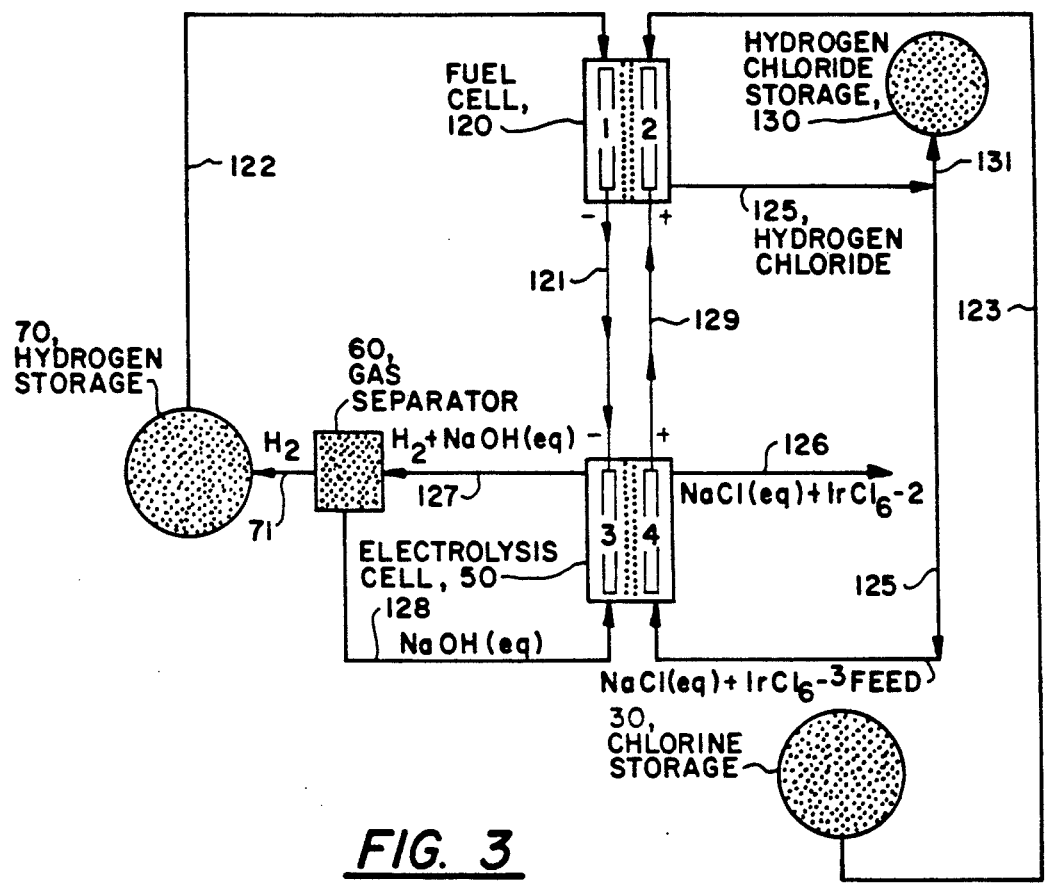
FIG. 3 is a schematic block diagram of the apparatus and method embodied by the overall, integrated operation for the on-site generation of electrical power in conjunction with the radiation-augmented, electrolytic production of alkali metal hydroxide, molecular halogen, and hydrogen.

The apparatus and method of another illustrative embodiment will now be described with reference to FIG. 3, which depicts the overall, integrated operation for the on-site generation of electrical power in conjunction with the radiation-augmented, electrolytic production of alkali metal hydroxide, molecular halogen, and hydrogen.

By utilizing a conventional fuel cell to combine the hydrogen and chlorine gases produced in the radiation-augmented electrolysis step, electrical power is generated, which is then utilized to supply a substantial portion of the power requirement of the electrolytic cell. With a theoretical half-cell voltage of 1.36 volts for the fuel cell, electrical energy produced as a result of the hydrogen-chlorine reaction can supplement the theoretical 1.69 volt requirement associated with the electrolysis of iridium hexachloride.

In the integrated mode of operation, hydrogen produced in the radiation-augmented electrolysis step and chlorine produced in the photolysis step (FIG. 1) are stored in hydrogen storage vessel 70 and chlorine storage vessel 30. The hydrogen and chlorine are conveyed to fuel cell 120 where they react to produce HCl and generate electrical energy. The fuel cell 120 is coupled to electrolysis cell 50, where the electrical power is utilized to supplant a portion of the import electrical power requirement. A portion of the HCl produced in the fuel cell is conveyed to the electrolysis cell's $IrCl_6^{-3}$/NaCl feed stream, with which it is mixed to provide the requisite level of brine acidification. Remaining excess HCl is conveyed to and stored in hydrogen chloride storage vessel 130.

While the present invention has been disclosed in connection with the preferred embodiments thereof, it should be appreciated that there may be other embodiments of the present invention which fall within the spirit and scope of the present invention as defined by the appended claims.

What is claimed is:

1. A method of depositing solar energy, comprising the steps of:
    using solar photolytic energy to excite a transition metal halide complex in solution with an alkali halide, causing a metal ion-ligand to be photochemically reduced to a lower oxidation state, and halide ions to be oxidized to molecular halogen;
    using solar thermal energy to heat said solution; and
    continuously removing said molecular halogen from the presence of said photolytic reaction;
    whereby said alkali halide solution comprises an anolyte.

2. The method of claim 1, further comprising the use of electrical energy to electrolyze said photochemically reduced, transition metal halide complex in solution with an alkali halide anolyte, causing said metal ion-ligand to be electrolytically oxidized to a higher oxidation state of that species, and water to be reduced to molecular hydrogen and hydroxide ions in an aqueous alkali metal hydroxide catholyte.

3. A method of producing alkali metal hydroxide, molecular halogen, and hydrogen from an alkali halide anolyte in solution with a transition metal halide complex, and an aqueous alkali metal hydroxide catholyte, comprising:
    using solar photolytic energy to excite a transition metal halide complex in solution with said anolyte, causing a metal ion-ligand to be photochemically reduced to a lower oxidation state, and halide ions to be oxidized to molecular halogen;
    continuously removing said molecular halogen from the presence of said photolytic reaction;
    recovering solar thermal energy from said solution of transition metal halide complex and anolyte;
    using electrical energy to electrolyze said photochemically reduced, transition metal halide complexes in solution with said anolyte, causing said metal ion-ligand to be electrolytically oxidized to a higher oxidation state of that species, water to be reduced to molecular hydrogen and hydroxide ions in said catholyte, and producing said alkali metal hydroxide;
    separating said molecular hydrogen from said catholyte; and
    utilizing said solar thermal energy to evaporate water from said catholyte, producing steam and a concentrated aqueous solution of alkali metal hydroxide.

4. The method of claim 1, 2, or 3, wherein said photolysis occurs during the solar day, with said photochemically reduced metal ion-ligand stored for subsequent electrolysis.

5. The method of claim 2 or 3, wherein said electrolysis occurs during the night with off-peak electrical energy.

6. The method of claim 1, 2, or 3, further comprising the addition of an excess of halide ions to said alkali halide.

7. The method of claim 3, further comprising:
    reacting said hydrogen and molecular halogen in a fuel cell to produce hydrogen halide and generate electrical power;
    conveying said electrical power to said electrolysis cell; and
    conveying a portion of said hydrogen halide to, and mixing with, said photochemically reduced, transition metal halide complexes in solution with said anolyte.

8. The method of claims 2 or 3, further comprising:
    adding hydrogen halide to said anolyte in an amount sufficient to acidify said anolyte.

9. The method of claim 1, 2, or 3, further comprising the use of two or more transition metal halide complexes in solution with said alkali halide simultaneously.

10. A solar energy deposition system comprising:
    a transition metal halide complex in solution with an alkali metal halide
    means for using solar photolytic energy to excite said transition metal halide complex in solution with an alkali halide, causing a metal ion-ligand to be photochemically reduced to a lower oxidation state, and halide ions to be oxidized to molecular halogen;
    means for using solar thermal energy to heat said solution; and
    means for continuously removing said molecular halogen from the presence of said photolytic reaction; whereby said alkali halide solution comprises an anolyte.

11. The system of claim 10, further comprising means for the use of electrical energy to electrolyze said photochemically reduced, transition metal halide complex in solution with an alkali halide anolyte, causing said metal ion-ligand to be electrolytically oxidized to a higher oxidation state of that species, and water to be reduced to molecular hydrogen and hydroxide ions in an aqueous alkali metal hydroxide catholyte.

12. A system for producing alkali metal hydroxide, molecular halogen, and hydrogen from an alkali halide anolyte in solution with a transition metal halide complex, and an aqueous alkali metal hydroxide catholyte, comprising:
    a transition metal halide complex in solution with said anolyte
    means for using solar photolytic energy to excite said transition metal halide complex in solution with said anolyte, causing a metal ion-ligand to be photochemically reduced to a lower oxidation state, and halide ions to be oxidized to molecular halogen;
    means for continuously removing said molecular halogen from the presence of said photolytic reaction;
    means for recovering solar thermal energy from said solution of transition metal halide complex and anolyte;
    means for using electrical energy to electrolyze said photochemically reduced, transition metal halide complex in solution with said anolyte, causing said metal ion-ligand to be electrolytically oxidized to a higher oxidation state of that species, water to be reduced to molecular hydrogen and hydroxide ions in said catholyte, and producing said alkali metal hydroxide;

means for separating said molecular hydrogen from said catholyte; and means for utilizing said solar thermal energy to evaporate water form said catholyte, producing steam and a concentrated aqueous solution of alkali metal hydroxide.

13. The system of claim 12, further comprising:

means for reacting said hydrogen and molecular halogen in a fuel cell to produce hydrogen halide and generate electrical power;

means for conveying said electrical power to said electrolysis cell; and means for conveying a portion of said hydrogen halide to, and mixing with, said photochemically reduced, transition metal halide complexes in solution with said anolyte.

14. The system of claim 11 or 12, wherein said means for the use of electrical energy to electrolyze said photochemically reduced, transition metal halide complexes in solution with said anolyte includes the use of a cation exchange membrane.

15. The system of claim 14, wherein said means for the use of electrical energy to electrolyze said photochemically reduced, transition metal halide complexes in solution with said anolyte includes the use of an anion exchange membrane.

* * * * *